Patented Apr. 30, 1968

3,381,005
2,5-DIHYDRO-4-HYDROXY-2-OXOTHIOPHEN-
3-CARBOXYLATES
Gilbert Joseph Stacey, Macclesfield, England, assignor to
Imperial Chemical Industries Limited, London, England, a corporation of Great Britain
No Drawing. Filed Feb. 11, 1965, Ser. No. 431,971
7 Claims. (Cl. 260—240)

ABSTRACT OF THE DISCLOSURE 2,5-dihydro-4-hydroxy-2-oxothiophen - 3 - carboxylates which possess anti-allergic properties and suppress the formation of antibodies. The compounds are characterized by carrying a benzylidene substituent or the like in the 5-position. These products are made by reacting a 4-hydroxy-2-oxothiophen-3-carboxylate which is unsubstituted in the 5-position with the appropriate aldehyde.

This invention relates to heterocyclic compounds and more particularly it relates to thiophen derivatives which possess useful therapeutic properties.

According to the invention we provide thiophen derivatives which in one of their tautomeric forms may be represented by the formula:

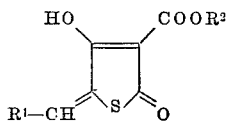

wherein $R^1$ stands for an aralkenyl, aryl or heterocyclic radical, optionally substituted, and wherein $R^2$ stands for an alkyl, cycloalkyl, alkenyl or aralkyl radical, optionally substituted.

As suitable values for $R^1$ when it stands for an aralkenyl radical, optionally substituted, there may be mentioned, for example, an aralkenyl radical of not more than 10 carbon atoms, for example the styryl radical, optionally substituted.

As suitable values for $R^1$ when it stands for an aryl radical, optionally substituted, there may be mentioned, for example, an aryl radical of not more than 10 carbon atoms, for example the phenyl radical optionally bearing one or more substituents selected from the group consisting of a halogen atom, for example the chlorine, bromine or fluorine atom, the nitro radical and a dialkylamino radical, for example the dimethylamino radical. Thus as suitable values for $R^1$ when it stands for a substituted aryl radical there may be mentioned, for example, the 4-dimethylaminophenyl, 3- or 4-chlorophenyl, 3- or 4-nitrophenyl, pentafluorophenyl and 4-bromophenyl radicals.

As suitable values for $R^1$ when it stands for a heterocyclic radical, optionally substituted, there may be mentioned, for example, the thienyl radical, optionally substituted.

As suitable values for $R^2$ when it stands for an alkyl radical there may be mentioned, for example, an alkyl radical of not more than 6 carbon atoms, for example a methyl, ethyl, propyl or butyl radical, which may optionally be substituted for example by an alkoxy radical or halogen atom, for example by the methoxy or ethoxy radical or the chlorine atom.

As suitable values for $R^2$ when it stands for a cycloalkyl radical, optionally substituted, there may be mentioned, for example, a cycloalkyl radical of not more than 6 carbon atoms, optionally substituted, for example the cyclohexyl radical, optionally substituted.

As suitable values for $R^2$ when it stands for an alkenyl radical, optionally substituted, there may be mentioned, for example, an alkenyl radical of not more than 6 carbon atoms, optionally substituted, for example the allyl radical.

As suitable values for $R^2$ when it stands for an aralkyl radical, optionally substituted, there may be mentioned, for example, aralkyl radicals of not more than 8 carbon atoms, for example the benzyl radical, optionally substituted.

Particularly valuable thiophen derivatives of the formula stated above are those wherein $R^1$ stands for a phenyl radical optionally substituted by halogen atoms for example chlorine atoms, and/or a nitro group and wherein $R^2$ stands for an alkyl radical of not more than 4 carbon atoms, for example an ethyl radical.

Specific compounds of the present invention are, in one of their tautomeric forms, ethyl 5-benzylidene-2,
5-dihydro-4-hydroxy-2-oxothiophen-3-carboxylate,
ethyl 2,5-dihydro-5-(4-dimethylaminobenzylidene)-
4-hydroxy-2-oxothiophen-3-carboxylate,
ethyl 2,5-dihydro-4-hydroxy-5-(4-nitrobenzylidene)-2-
oxothiophen-3-carboxylate,
ethyl 5-(2,3,6-trichlorobenzylidene)-2,5-dihydro-
4-hydroxy-2-oxothiophen-3-carboxylate,
ethyl 5-(4-chlorobenzylidene)-2,5-dihydro-4-hydroxy-
2-oxothiophen-3-carboxylate, and
ethyl 2,5-dihydro-4-hydroxy-2-oxo-5-(then-3-ylidene)-
thiophen-3-carboxylate.

According to a further feature of the invention we provide a process for the manufacture of the said thiophen derivatives which comprises the interaction of a compound of the formula :

$$R^1 \cdot CHO$$

wherein $R^1$ has the meaning stated above and a compound of the formula:

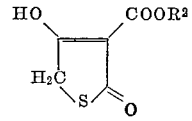

wherein $R^2$ has the meaning stated above.

The interaction may optionally be carried out in the presence of a diluent or solvent, for example ethanol or acetic anhydride. The interaction may be accelerated or completed by the application of heat, and may be carried out, for example, at a temperature between 30° C. and 130° C. and preferably between 70° C. and 80° C. The interaction is preferably carried out in the presence of an acidic or a basic catalyst. As a suitable catalyst there may be mentioned, for example, a metal alkoxide, for example sodium methoxide, or an organic base, for example piperidine, or an inorganic acid, for example hydrogen chloride.

According to a further feature of the invention we provide a process for the manufacture of those of the thiophen derivatives of the invention which in one of their tautomeric forms may be represented by the formula:

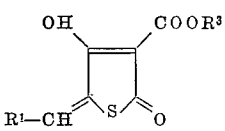

wherein $R^1$ has the meaning stated above, and wherein $R^3$ stands for an alkyl radical of more than 2 carbon atoms, or a substituted alkyl radical, an aralkyl radical or a cycloalkyl radical, optionally substituted, which comprises the interaction of those of the thiophen derivatives of the invention wherein R² stands for a methyl or an ethyl radical, and an excess of an alcohol of the formula R³OH wherein R³ has the meaning stated above.

As suitable values for R³ there may be mentioned, for example, unsubstituted alkyl radicals of not more than 6 carbon atoms, alkoxyalkyl radicals, halogenoalkyl radicals, cycloalkyl and aralkyl radicals, for example propyl, butyl, ethoxyethyl, chloroethyl, cyclohexyl and benzyl radicals.

The interaction may be accelerated or completed by the application of heat, and may optionally be carried out in the presence of an acidic catalyst, for example hydrogen chloride. The interaction may optionally be accelerated or completed by removing the methanol or ethanol formed during the interaction. For example the methanol or ethanol may be removed by fractional distillation.

The thiophen derivatives of the invention possess anti-allergic properties and they suppress the formation of antibodies and thereby inhibit immunological processes. The compounds are of value in the treatment of allergies, and of diseases, in which immune mechanisms operate, for example nephritis or thyroiditis due to an auto-immune response, or sympathetic ophthalmitis, auto-immune haemolytic anaemia, lupus erythematosus arthritis and disseminated sclerosis. They are also of value in preventing the rejection of tissue grafts.

According to a further feature of the invention, therefore, we provide pharmaceutical compositions comprising as active ingredient one or more of the thiophen derivatives of the invention in admixture with a pharmaceutically acceptable diluent or carrier therefor.

The pharmaceutical compositions may be in the form of compositions suitable for oral administration, for example tablets, pills, capsules, solutions or suspensions, or compositions suitable for parenteral administration, for example injectable solutions or suspensions, or compositions suitable for topical application, for example creams, lotions or ointments. The pharmaceutical compositions contain conventional excipients, and they may be obtained by means of conventional techniques. Particularly useful compositions are tablets, pills, and capsules containing from 10 mg. to 500 mg. of the active ingredient and solutions or suspensions for oral or parenteral use containing from 10 mg./ml. to 500 mg./ml. of the active ingredient.

It is to be understood that compositions which are in the form of capsules may contain in the capsule either the active ingredient alone or the active ingredient in admixture with an inert diluent.

The pharmaceutical compositions may contain, in addition to the thiophen derivative or derivatives, one or more known anti-inflammatory agents, for example acetylsalicylic acid or phenylbutazone or anti-inflammatory steroids such as cortisone or hydrocortisone. Particularly useful compositions of the invention contain one or more of the said thiophen derivatives and phenylbutazone or acetylsalicylic acid in admixture with a pharmaceutically-acceptable diluent or carrier therefor. The compositions containing phenylbutazone or acetylsalicylic acid preferably contain between 10 mg. and 500 mg. of the thiophen derivative in the presence of between 50 mg. and 250 mg. of phenylbutazone, or between 25 mg. and 250 mg. of the thiophen derivative in the presence of between 50 mg. and 500 mg. of acetylsalicylic acid.

The invention is illustrated but not limited by the following Examples in which the parts are by weight:

Example 1

A mixture of 9.4 parts of ethyl 2,5-dihydro-4-hydroxy-2-oxothiophen-3-carboxylate, 5.2 parts of benzaldehyde and 32 parts of ethanol is heated under reflux during 6 hours. The mixture is cooled and filtered. The solid residue is crystallised from ethanol and these is thus obtained ethyl 5-benzylidene-2,5-dihydro-4-hydroxy-2-oxothiophen-3-carboxylate, M.P. 129.5–130.5° C.

Example 2

A mixture of 9.4 parts of ethyl 2,5-dihydro-4-hydroxy-2-oxothiophen-3-carboxylate, 5.2 parts of benzaldehyde and 43 parts of acetic anhydride is heated at 95–100° C. during 1.5 hours. The solution is cooled and stirred with 100 parts of water until a solid is obtained. The mixture is filtered and the solid residue is washed with ethanol. There is thus obtained ethyl 5-benzylidene-2,5-dihydro-4-hydroxy-2-oxothiophen-3-carboxylate, M.P. 129–130° C.

Example 3

A mixture of 28.2 parts of ethyl 2,5-dihydro-4-hydroxy-2-oxothiophen-3-carboxylate, 24.6 parts of 4-dimethylaminobenzaldehyde, 12.8 parts of piperidine and 100 parts of ethanol is refluxed during 3 hours. The solution is cooled and 50% aqueous acetic acid is added until the pH of the mixture is 5. The mixture is filtered and the solid residue is washed with water and dried. The solid is crystallised from ethanol. There is thus obtained ethyl 5-(4-dimethylaminobenzylidene) - 2,5-dihydro-4-hydroxy-2-oxothiophen-3-carboxylate, M.P. 172–173° C.

Example 4

A mixture of 28.2 parts of ethyl 2,5-dihydro-4-hydroxy-2-oxothiophen-3-carboxylic, 25.7 parts of 4-nitro-benzaldehyde, 12.8 parts of piperidine and 100 parts of ethanol is refluxed for 6 hours and is then cooled. The solution is adjusted to pH 3 by the addition of 30 parts of 5 N-hydrochloric acid, and the precipitated solid is filtered, washed with ethanol and dried. There is thus obtained ethyl 2,5-dihydro-4-hydroxy - 5-(4-nitrobenzylidene)-2-oxothiophen-3-carboxylate, M.P. 259° C.

The process described above is repeated except that the 4-hydroxybenzaldehyde is replaced by an equivalent amount of an appropriate aldehyde. There are thus obtained compounds of the formula:

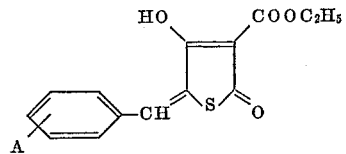

wherein the substituent A has the values shown in the table below. The numbers in parenthesis indicate the position(s) of the substituent(s) in the benzene ring.

| A: | M.p. (° C.) |
|---|---|
| OH(4)OCH₃(3) | 176–178 |
| NO₂(3) | 181–182 |
| Cl(3) | 145–146 |
| Cl(4) | 167–168 |
| Cl(2)Cl(4) | 222–223 |
| Cl(2)Cl(3)Cl(6) | 198–199 |
| Cl(2)NO₂(5) | 172–174 |
| Br(4) | 179–180 |
| F(2)F(3)F(4)F(5)F(6) | 123–124 |

Example 5

A mixture of 28.2 parts of ethyl 2,5-dihydro-4-hydroxy-2-oxothiophen-3-carboxylate, 20.1 parts of thiophen-3-aldehyde, 12.8 parts of piperidine and 96 parts of ethanol is heated under reflux for 4 hours. The solution is cooled and 5 N hydrochloric acid is added until the pH of the mixture is 3. The mixture is filtered and the solid residue is collected, washed with ethanol and recrystallized from ethanol. There is thus obtained ethyl 2,5-dihydro-4-hydroxy-2-oxo-5-(then-3-ylidene) - thiophen-3-carboxylate, M.P. 152–153° C.

In a similar manner, using an equal weight of thiophen-2-aldehyde in place of thiophen-3-aldehyde there is obtained ethyl 2,5-dihydro - 4 - hydroxy-2-oxo-5-(then-2-ylidene)thiophen-3-carboxylate, M.P. 168–169° C.

Example 6

A mixture of 4 parts of ethyl 2,5-dihydro-4-hydroxy-5-(4 - nitrobenzylidene)-2-oxothiophen-3-carboxylate and 32 parts of n-butanol containing a catalytic amount of hydrogen chloride is heated under reflux during 30 minutes and is then allowed to cool. The mixture is filtered and there is thus obtained n-butyl 2,5-dihydro-4-hydroxy-5-(4-nitrobenzylidene) - 2 - oxothiophen-3-carboxylate, M.P. 176–177° C.

The process described above is repeated except that ethyl 2,5-dihydro-4-hydroxy-5 - (4 - nitrobenzylidene)-2-oxothiophen - 3 - carboxylate is replaced by a molecular equivalent amount of ethyl 5-(4-chlorobenzylidene)-2,5-dihydro-4-hydroxy-2-oxothiophen-3-carboxylate. There is thus obtained n-butyl 5-(4-chlorobenzylidene)-2,5-dihydro-4-hydroxy-2-oxothiophen-3 - carboxylate, M.P. 150–151° C.

Example 7

A mixture of 13.8 parts of ethyl 5-benzylidene-2,5-dihydro-4-hydroxy-2-oxothiophen - 3 - carboxylate and 21 parts of benzyl alcohol containing 0.5 part of a 15% solution of hydrogen chloride in ethanol is heated for 5 minutes at 140° C. in an open vessel. The solution is allowed to cool. The mixture thus obtained is filtered and the solid residue is washed with ether and then is recrystallised first from benzyl alcohol and then from acetonitrile. There is thus obtained benzyl 5-benzylidene-2,5-dihydro-4-hydroxy - 2 - oxothiophen-3-carboxylate, M.P. 148–150° C. The above process is repeated using in place of benzyl alcohol a molecular equivalent amount of an appropriate alcohol and there are thus obtained (2-chloroethyl) 5-benzylidene-2,5 - dihydro-4-hydroxy-2-oxothiophen-3-carboxylate, M.P. 154–157.5° C., (2 - ethoxyethyl) 5-benzylidene-2,5-dihydro - 4 - hydroxy-2-oxothiophen-3-carboxylate, M.P. 78–80° C., and cyclohexyl 5-benzylidene-2,5-dihydro - 4 - hydroxy - 2-oxothiophen-3-carboxylate, M.P. 123° C.

Example 8

A mixture of 26 parts of methyl 2,5-dihydro-4-hydroxy-2-oxothiophen-3-carboxylate, 16 parts of benzaldehyde, 13 parts of piperidine, and 80 parts of methanol is boiled under reflux for 3 hours and is then allowed to cool. The reaction mixture is then acidified to pH 3 with 5 N hydrochloric acid. The solid thus precipitated is collected by filtration, washed with water, dried and crystallised from acetonitrile. There is thus obtained methyl 5-benzylidene-2,5 - dihydro - 4 - hydroxyl - 2 - oxothiophen - 3 - carboxylate of M.P. 177–179° C.

Methyl 2,5 - dihydro - 4 - hydroxy - 2 - oxothiophen - 3-carboxylate used as starting material in the above process may be obtained as follows: 33 parts of dimethyl malonate are added to 275 parts of dry diethyl ether containing 5.75 parts of sodium. When the spontaneous reaction is complete the reaction mixture is then cooled and stirred at 10° C. whilst 19.1 parts of S-acetylthioglycollyl chloride are slowly added. Stirring is continued for 1 hour after the addition is complete, and sufficient 2 N-sulphuric acid to give complete solution is then added to the mixture. The ethereal layer is separated and the aqueous phase thus obtained is extracted with ether. The ethereal extract is added to the ethereal layer and the combined ethereal solutions are then extracted with 120 parts of 2 N-aqueous sodium carbonate solution in four equal portions. The aqueous extracts are combined and then brought to pH 3 by the addition of 5 N-hydrochloric acid. The oil which is thus precipitated is redissolved by the addition of 10 N-sodium hydroxide solution. The mixture is brought quickly to pH 3 by addition of 5 N-hydrochloric acid, and the solid thus precipitated is collected by filtration, washed with water, dried and crystallised from acetonitrile. There is thus obtained methyl 2,5-dihydro-4-hydroxy-2-oxothiophen-3-carboxylate, M.P. 201–204° C. with decomposition.

The process described above is repeated using appropriate reagents in place of methyl 2,5-dihydro-4-hydroxy-2-oxothiophen-3-carboxylate, benzaldehyde and methanol. There are thus obtained n-propyl 5-benzylidene-2,5-dihydro - 4 - hydroxy - 2 - oxothiophen - 3 - carboxylate, M.P., 99–100° C., isopropyl 5-benzylidene-2,5-dihydro-4-hydroxy-2-oxothiophen-3-carboxylate, M.P. 128–129° C., allyl 5-benzylidene-2,5-dihydro-4-hydroxy-2-oxothiophen-3-carboxylate, M.P., 100–101° C. and allyl 5-(4-chlorobenzylidene) - 2,5 - dihydro - 4 - hydroxy - 2 - oxothiophen-3-carboxylate, M.P. 156–157° C.

Propyl-, isopropyl- and allyl- 2,5-dihydro-4-hydroxy-2-oxothiophen-3-carboxylates used as starting materials in the above processes are obtained in a similar manner to that described above for the preparation of methyl 5-benzylidene - 2,5 - dihydro - 4 - hydroxy - 2 - oxothiophen-3-carboxylate. n-propyl 2,5-dihydro-4-hydroxy-2-oxothiophen-3-carboxylate has M.P. 55–57° C., isopropyl 2,5-dihydro - 4 - hydroxy - 2 - oxothiophen - 3 - carboxylate has M.P. 81–82° C., and allyl 2,5-dihydro-4-hydroxy-2-oxothiophen-3-carboxylate has M.P. 89–91° C.

Example 9

A stream of hydrogen chloride gas is passed through a suspension of 18.8 parts of ethyl 2,5-dihydro-4-hydroxy-2-oxothiophen-3-carboxylate and 13.2 parts of cinnamaldehyde in 80 parts of ethanol. An exothermic reaction takes place and the suspended solid goes into solution. The solution thus obtained is kept for 1 hour during which a solid separates from the solution. The solid is collected by filtration, washed with ethanol, dried and crystallised from acetonitrile. There is thus obtained ethyl 5-cinnamylidene-2,5 - dihydro - 4 - hydroxy - 2 - oxothiophen - 3 - carboxylate, M.P. 175–176° C.

The above process is repeated using 10.6 parts of benzaldehyde in place of 13.2 parts of cinnamaldehyde. There is thus obtained ethyl 5-benzylidene-2,5-dihydro-4-hydroxy-4-oxothiophen-3-carboxylate, M.P. 129–130° C.

Example 10

A mixture of 250 parts of ethyl 5-benzylidene-2,5-dihydro - 4 - hydroxy - 2 - oxothiophen - 3 - carboxylate and 200 parts of light magnesium carbonate is granulated with a sufficient quantity of 5% w./v. starch paste and the granules are then dried. More maize starch is then added to make a total of 200 parts of maize starch and the mixture is then lubricated by the addition of 6 parts of magnesium stearate. The mixture is then compressed into tablets and there are obtained tablets which may contain from about 10 mg. to about 500 mg. of active ingredient and which may be used for oral administration for therapeutic purposes.

The 250 parts of ethyl 5-benzylidene-2,5-dihydro-4-hydroxy-2-oxothiophen-3-carboxylate used as starting material may be replaced by 250 parts of ethyl 2,5-dihydro-5 - (4 - dimethylaminobenzylidene) - 4 - hydroxy - 2 - oxothiophen-3-carboxylate, ethyl 2,5-dihydro-4-hydroxy-5-(4 - nitrobenzylidene) - 2 - oxothiophen - 3 - carboxylate, ethyl 5 - (2,3,6 - trichlorobenzylidene) - 2,5 - dihydro - 4-hydroxy-2-oxothiophen-3-carboxylate, ethyl 5-(4-chlorobenzylidene) - 2,5 - dihydro - 4 - hydroxy - 2 - oxothiophen-3-carboxylate or ethyl 2,5-dihydro-4-hydroxy-2-oxo-5-(then-3-ylidene)-thiophen-3-carboxylate and there are thus obtained tablets which may contain from about 10 mg. to about 500 mg. of active ingredient and which may be used for oral administration for therapeutic purposes.

Example 11

A mixture of 100 parts of ethyl 5-benzylidene-2,5-dihydro - 4 - hydroxy - 2 - oxothiophen - 3 - carboxylate and 100 parts of calcium phosphate is granulated by admixture with a sufficient quantity of aqueous 10% maize starch paste. The granules are passed through a 16-mesh screen and are then dried at 50–55° C. The dried granules are again passed through a 16-mesh screen, 1 part of magnesium stearate is then added theerto and the mixture is compressed into tablets which may contain from about 10 mg. to about 500 mg. of the active ingredient. There are thus obtained tablets which may be used for oral administration for therapeutic purposes.

The 100 parts of ethyl 5-benzylidene-2,5-dihydro-4-hydroxy-2-oxothiophen-3-carboxylate used as starting material may be replaced by 100 parts of any of the 5 thiophen derivatives mentioned at the end of Example 10 and there are likewise obtained tablets which may contain from about 10 mg. to about 500 mg. of active ingredient and which may be used for oral administration for therapeutic purposes.

Example 12

A mixture of 150 parts of ethyl 5-benzylidene-2,5-dihydroxy-2-oxothiophen-3-carboxylate, 300 parts of acetylsalicylic acid, 32.5 parts of citric acid, and 130 parts of maize starch is granulated by admixture with a sufficient quantity of ethanol. The granular mass is passed through a 12-mesh screen and the granules are dried at 50° C. After further sieving through a 16-mesh screen the granules are then mixed with 100 parts of calcium phosphate, 65 parts of lactose and 7 parts of magnesium stearate. The mixture so obtained is then compressed into tablets which may contain 10 mg. to 250 mg. of the ethyl-5-benzylidene-2,5-dihydro-4-hydroxy-2-oxothiophen-3 - carboxylate and 20 mg. to 500 mg. of acetylsalicylic acid and which may be used for oral administration for therapeutic purposes.

Instead of the 300 parts of acetysalicylic acid in the above example, there may be used 150 parts of phenylbutazone, and there are thus obtained tablets which may contain between about 10 mg. and about 250 mg. of each active ingredient and which may be used for oral administration for therapeutic purposes.

What we claim is:
1. A thiophen derivative of the formula:

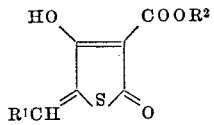

wherein $R^1$ is selected from the group consisting of phenyl-lower-alkenyl, 3-thienyl, phenyl, and phenyl bearing at least one substituent selected from the group consisting of halogen, nitro and di-lower-alkylamino, and $R^2$ is selected from the group consisting of lower alkyl, lower alkoxy-lower alkyl, lower cycloalkyl, lower alkenyl and benzyl.

2. Ethyl 5-benzylidene-2,5-dihydro-4-hydroxy - 2 - oxothiophen-3-carboxylate.

3. Ethyl 2,5-dihydro-5-(4-dimethylaminobenzylidene)-4-hydroxy-2-oxothiophen-3-carboxylate.

4. Ethyl 2,5-dihydro-4-hydroxy-5-(4-nitrobenzylidene)-2-oxothiophen-3-carboxylate.

5. Ethyl 5-(2,3,6-trichlorobenzylidene)-2,5-dihydro-4-hydroxy-2-oxothiophen-3-carboxylate.

6. Ethyl 5-(4-chlorobenzylidene)-2,5 - dihydro - 4 - hydroxy-2-oxothiophen-3-carboxylate.

7. Ethyl 2,5-dihydro-4-hydroxy-2-oxo-5-(then-3 - ylidene)-thiophen-3-carboxylate.

References Cited

Benary, Ber. Deut. Chem. vol. 43, pp. 1943 to 1951 (1910).

Hartough, "Thiophene and Its Derivatives," pp. 409 to 410, Interscience Publishers, Inc., N.Y. (1952).

J. RANDOLPH, *Primary Examiner*.